(12) United States Patent
Aymeloglu et al.

(10) Patent No.: US 9,229,966 B2
(45) Date of Patent: Jan. 5, 2016

(54) OBJECT MODELING FOR EXPLORING LARGE DATA SETS

(75) Inventors: Andrew Aymeloglu, Palo Alto, CA (US); Kevin Simler, Fremont, CA (US); Eric Poirier, San Carlos, CA (US); Garry Tan, Mountain View, CA (US); Brandon Burr, Palo Alto, CA (US)

(73) Assignee: Palantir Technologies, Inc., Palo Alto, CA (US)

(*) Notice: Subject to any disclaimer, the term of this patent is extended or adjusted under 35 U.S.C. 154(b) by 452 days.

(21) Appl. No.: 13/079,690

(22) Filed: Apr. 4, 2011

(65) Prior Publication Data
US 2011/0179042 A1 Jul. 21, 2011

Related U.S. Application Data

(62) Division of application No. 12/210,947, filed on Sep. 15, 2008, now abandoned.

(51) Int. Cl.
  *G06F 17/30* (2006.01)
  *G06Q 10/06* (2012.01)
  *G06Q 40/06* (2012.01)
  *G06Q 30/02* (2012.01)

(52) U.S. Cl.
  CPC .... *G06F 17/30321* (2013.01); *G06F 17/30592* (2013.01); *G06Q 10/06* (2013.01); *G06Q 30/0201* (2013.01); *G06Q 40/06* (2013.01)

(58) Field of Classification Search
  USPC ........................ 705/36 R; 707/776
  See application file for complete search history.

(56) References Cited

U.S. PATENT DOCUMENTS

| | | |
|---|---|---|
| 5,412,769 A | 5/1995 | Maruoka et al. |
| 5,414,838 A | 5/1995 | Kolton et al. |
| 5,444,819 A | 8/1995 | Negishi |
| 5,454,104 A | 9/1995 | Steidlmayer et al. |
| 5,819,238 A | 10/1998 | Fernholz |
| 5,872,973 A | 2/1999 | Mitchell et al. |
| 6,012,042 A | 1/2000 | Black et al. |
| 6,065,026 A | 5/2000 | Cornelia et al. |
| 6,072,942 A | 6/2000 | Stockwell et al. |

(Continued)

FOREIGN PATENT DOCUMENTS

| | | |
|---|---|---|
| EP | 1109116 | 6/2001 |
| EP | 1146649 A1 | 10/2001 |

(Continued)

OTHER PUBLICATIONS

Devanbu et al., "Authentic Third-Party Data Publication", http://seclab.cs.ucdavis.edu/~devanbu/authdbpub.pdf, 19 pages, dated 2000.

(Continued)

*Primary Examiner* — Eric T Wong
(74) *Attorney, Agent, or Firm* — Hickman Palermo Becker Bingham LLP

(57) ABSTRACT

Techniques are described for facilitating performing computer-implemented financial analysis. A metric that transforms one or more time series into an output object is identified. The one or more time series are determined based on one or more input objects. The metric is applied using the one or more time series, thereby generating a particular value for the output object. One of the metric and the particular value for the output object is stored in a physical storage device.

27 Claims, 13 Drawing Sheets

(56) References Cited

U.S. PATENT DOCUMENTS

| | | |
|---|---|---|
| 6,104,401 A | 8/2000 | Parsons |
| 6,161,098 A | 12/2000 | Wallman |
| 6,189,005 B1 | 2/2001 | Chakrabarti et al. |
| 6,289,338 B1 | 9/2001 | Stoffel et al. |
| 6,313,833 B1 | 11/2001 | Knight |
| 6,349,315 B1 | 2/2002 | Sonoyama et al. |
| 6,496,817 B1 | 12/2002 | Whang et al. |
| 6,513,019 B2 | 1/2003 | Lewis |
| 6,532,449 B1 | 3/2003 | Goertzel et al. |
| 6,640,231 B1 | 10/2003 | Andersen et al. |
| 6,662,202 B1 | 12/2003 | Krusche et al. |
| 6,748,481 B1 | 6/2004 | Parry et al. |
| 6,801,201 B2 | 10/2004 | Escher |
| 6,876,981 B1 | 4/2005 | Berckmans |
| 6,907,426 B2 | 6/2005 | Hellerstein et al. |
| 6,920,453 B2 | 7/2005 | Mannila et al. |
| 7,043,449 B1 | 5/2006 | Li et al. |
| 7,086,028 B1 | 8/2006 | Davis et al. |
| 7,111,231 B1 | 9/2006 | Huck et al. |
| 7,133,409 B1 | 11/2006 | Willardson |
| 7,181,423 B2 | 2/2007 | Blanchard et al. |
| 7,185,065 B1 | 2/2007 | Holtzman et al. |
| 7,213,030 B1 | 5/2007 | Jenkins |
| 7,216,299 B2 | 5/2007 | Knight |
| 7,237,192 B1 | 6/2007 | Stephenson et al. |
| 7,240,330 B2 | 7/2007 | Fairweather |
| 7,246,090 B1 | 7/2007 | Thomas |
| 7,356,504 B2 | 4/2008 | Müller |
| 7,401,038 B2 | 7/2008 | Masuda |
| 7,403,921 B2 | 7/2008 | Tanpoco et al. |
| 7,403,922 B1 | 7/2008 | Lewis et al. |
| 7,437,728 B2 | 10/2008 | Stackhouse et al. |
| 7,441,182 B2 | 10/2008 | Beilinson et al. |
| 7,469,238 B2 | 12/2008 | Satchwell |
| 7,533,069 B2 | 5/2009 | Fairweather |
| 7,542,934 B2 | 6/2009 | Markel |
| 7,587,352 B2 | 9/2009 | Arnott |
| 7,590,582 B2 | 9/2009 | Dunne |
| 7,620,582 B2 | 11/2009 | Masuda |
| 7,630,931 B1 | 12/2009 | Rachev et al. |
| 7,657,478 B2 | 2/2010 | De Diego |
| 7,685,042 B1 | 3/2010 | Monroe et al. |
| 7,685,083 B2 | 3/2010 | Fairweather |
| 7,716,227 B1 | 5/2010 | Hao et al. |
| 7,725,728 B2 | 5/2010 | Ama et al. |
| 7,835,966 B2 | 11/2010 | Satchwell |
| 7,848,995 B2 | 12/2010 | Dalal |
| 8,010,507 B2 | 8/2011 | Poston et al. |
| 8,036,971 B2 | 10/2011 | Aymeloglu et al. |
| 8,041,714 B2 | 10/2011 | Aymeloglu et al. |
| 8,046,283 B2 | 10/2011 | Burns |
| 8,112,425 B2 | 2/2012 | Baum et al. |
| 8,230,333 B2 | 7/2012 | Decherd et al. |
| 8,280,880 B1 | 10/2012 | Aymeloglu et al. |
| 8,301,464 B1 | 10/2012 | Cave et al. |
| 8,326,727 B2 | 12/2012 | Aymeloglu et al. |
| 8,484,115 B2 | 7/2013 | Aymeloglu et al. |
| 8,484,549 B2 | 7/2013 | Burr et al. |
| 8,494,941 B2 | 7/2013 | Aymeloglu et al. |
| 8,909,656 B2 | 12/2014 | Kumar et al. |
| 8,938,686 B1 | 1/2015 | Erenrich et al. |
| 2001/0011243 A1 | 8/2001 | Dembo et al. |
| 2002/0007329 A1 | 1/2002 | Alcaly et al. |
| 2002/0007331 A1 | 1/2002 | Lo et al. |
| 2002/0026404 A1 | 2/2002 | Thompson |
| 2002/0030701 A1 | 3/2002 | Knight |
| 2002/0059126 A1 | 5/2002 | Ricciardi |
| 2002/0087570 A1 | 7/2002 | Jacquez et al. |
| 2002/0099870 A1 | 7/2002 | Miller et al. |
| 2002/0138383 A1 | 9/2002 | Rhee |
| 2002/0147671 A1 | 10/2002 | Sloan et al. |
| 2002/0156812 A1 | 10/2002 | Krasnoiarov et al. |
| 2003/0009392 A1 | 1/2003 | Perkowski |
| 2003/0009399 A1* | 1/2003 | Boerner .......... 705/35 |
| 2003/0065605 A1 | 4/2003 | Gatto |
| 2003/0065606 A1 | 4/2003 | Satchwell |
| 2003/0065607 A1 | 4/2003 | Satchwell |
| 2003/0078827 A1 | 4/2003 | Hoffman |
| 2003/0130996 A1 | 7/2003 | Bayerl et al. |
| 2003/0144868 A1 | 7/2003 | MacIntyre et al. |
| 2003/0163352 A1 | 8/2003 | Surpin et al. |
| 2003/0172021 A1 | 9/2003 | Huang |
| 2003/0172053 A1 | 9/2003 | Fairweather |
| 2003/0182177 A1 | 9/2003 | Gallagher |
| 2003/0184588 A1 | 10/2003 | Lee |
| 2003/0187761 A1 | 10/2003 | Olsen et al. |
| 2004/0133500 A1 | 7/2004 | Thompson et al. |
| 2004/0153418 A1 | 8/2004 | Hanweck |
| 2004/0193599 A1 | 9/2004 | Liu et al. |
| 2005/0060712 A1 | 3/2005 | Miller et al. |
| 2005/0060713 A1 | 3/2005 | Miller et al. |
| 2005/0075962 A1 | 4/2005 | Dunne |
| 2005/0075966 A1 | 4/2005 | Duka |
| 2005/0090911 A1* | 4/2005 | Ingargiola et al. .......... 700/36 |
| 2005/0108001 A1 | 5/2005 | Aarskog |
| 2005/0171881 A1 | 8/2005 | Ghassemieh et al. |
| 2005/0182709 A1 | 8/2005 | Belcsak et al. |
| 2005/0256703 A1 | 11/2005 | Markel |
| 2005/0262004 A1 | 11/2005 | Sakata et al. |
| 2005/0262057 A1 | 11/2005 | Lesh et al. |
| 2006/0020398 A1 | 1/2006 | Vernon et al. |
| 2006/0052984 A1 | 3/2006 | Nakadate et al. |
| 2006/0053097 A1 | 3/2006 | King et al. |
| 2006/0059072 A1 | 3/2006 | Boglaev |
| 2006/0064181 A1* | 3/2006 | Kato .......... 700/42 |
| 2006/0116943 A1 | 6/2006 | Willain |
| 2006/0136513 A1 | 6/2006 | Ngo et al. |
| 2006/0149596 A1 | 7/2006 | Surpin et al. |
| 2006/0218405 A1 | 9/2006 | Ama et al. |
| 2006/0224356 A1 | 10/2006 | Castelli et al. |
| 2006/0235786 A1 | 10/2006 | DiSalvo |
| 2006/0241974 A1 | 10/2006 | Chao et al. |
| 2006/0265311 A1 | 11/2006 | Dean et al. |
| 2006/0265397 A1 | 11/2006 | Bryan et al. |
| 2007/0055598 A1 | 3/2007 | Arnott et al. |
| 2007/0055599 A1 | 3/2007 | Arnott |
| 2007/0067233 A1 | 3/2007 | Dalal |
| 2007/0091868 A1 | 4/2007 | Hollman et al. |
| 2007/0112714 A1 | 5/2007 | Fairweather |
| 2007/0118527 A1 | 5/2007 | Winje et al. |
| 2007/0136115 A1 | 6/2007 | Doganaksoy et al. |
| 2007/0168269 A1 | 7/2007 | Chuo |
| 2007/0168270 A1 | 7/2007 | De Diego Arozamena et al. |
| 2007/0168871 A1 | 7/2007 | Jenkins |
| 2007/0219882 A1 | 9/2007 | May |
| 2007/0226617 A1 | 9/2007 | Traub et al. |
| 2007/0282951 A1 | 12/2007 | Selimis et al. |
| 2008/0015920 A1 | 1/2008 | Fawls et al. |
| 2008/0040250 A1 | 2/2008 | Salter |
| 2008/0046803 A1 | 2/2008 | Beauchamp et al. |
| 2008/0172607 A1 | 7/2008 | Baer |
| 2008/0183639 A1 | 7/2008 | DiSalvo |
| 2008/0195417 A1 | 8/2008 | Surpin et al. |
| 2008/0208820 A1 | 8/2008 | Usey et al. |
| 2008/0215546 A1* | 9/2008 | Baum et al. .......... 707/3 |
| 2008/0249957 A1 | 10/2008 | Masuyama et al. |
| 2008/0263468 A1 | 10/2008 | Cappione et al. |
| 2008/0288306 A1 | 11/2008 | MacIntyre et al. |
| 2008/0288471 A1 | 11/2008 | Wu et al. |
| 2008/0313243 A1 | 12/2008 | Poston et al. |
| 2009/0006271 A1 | 1/2009 | Crowder |
| 2009/0031401 A1 | 1/2009 | Cudich et al. |
| 2009/0094166 A1* | 4/2009 | Aymeloglu et al. .......... 705/36 R |
| 2009/0106308 A1 | 4/2009 | Killian et al. |
| 2009/0112678 A1 | 4/2009 | Luzardo |
| 2009/0112922 A1 | 4/2009 | Barinaga |
| 2009/0138307 A1 | 5/2009 | Belcsak et al. |
| 2009/0172511 A1 | 7/2009 | Decherd et al. |
| 2009/0193050 A1 | 7/2009 | Olson |
| 2009/0313250 A1 | 12/2009 | Folting et al. |
| 2009/0319418 A1 | 12/2009 | Herz |
| 2009/0327157 A1 | 12/2009 | Dunne |
| 2010/0057600 A1 | 3/2010 | Johansen et al. |
| 2010/0070426 A1 | 3/2010 | Aymeloglu et al. |

(56) References Cited

U.S. PATENT DOCUMENTS

| | | |
|---|---|---|
| 2010/0070489 A1 | 3/2010 | Aymeloglu et al. |
| 2010/0070844 A1 | 3/2010 | Aymeloglu et al. |
| 2010/0205108 A1 | 8/2010 | Mun |
| 2010/0283787 A1 | 11/2010 | Hamedi et al. |
| 2010/0312530 A1 | 12/2010 | Capriotti |
| 2010/0325581 A1 | 12/2010 | Finkelstein et al. |
| 2011/0179042 A1 | 7/2011 | Aymeloglu et al. |
| 2011/0218934 A1 | 9/2011 | Elser |
| 2012/0030140 A1 | 2/2012 | Aymeloglu et al. |
| 2012/0144335 A1 | 6/2012 | Abeln et al. |
| 2012/0221553 A1 | 8/2012 | Wittmer et al. |
| 2012/0221580 A1 | 8/2012 | Barney |
| 2013/0073377 A1 | 3/2013 | Heath |
| 2013/0290161 A1 | 10/2013 | Aymeloglu et al. |
| 2013/0293553 A1 | 11/2013 | Burr et al. |
| 2014/0279865 A1 | 9/2014 | Kumar |

FOREIGN PATENT DOCUMENTS

| | | |
|---|---|---|
| WO | WO 2008/121499 | 10/2008 |
| WO | WO 2009/042548 | 4/2009 |
| WO | WO 2010/030915 | 3/2010 |
| WO | WO 2010/030946 | 3/2010 |
| WO | WO 2010/030949 | 3/2010 |

OTHER PUBLICATIONS

U.S. Appl. No. 12/210,947, filed Sep. 15, 2008, Office Action, mailed Jul. 1, 2013.
"A First Look: Predicting Market Demand for Food Retail using a Huff Analysis," TRF Policy Solutions, Jul. 2012, pp. 30.
Azad, Khalid, "A Visual Guide to Version Control," <http://betterexplained.com/articles/a-visual-guide-to-version-control/>, Sep. 27, 2007 in 11 pages.
Beverley, Bill, "Windows Tips & Tricks," <http://alamopc.org/pcalamode/columns/beverley/bb0301.shtml>, Mar. 2001 in 5 pages.
Bradbard, Matthew, "Technical Analysis Applied," <http://partners.futuresource.com/fastbreak/2007/0905.htm>, Sep. 5, 2007, pp. 6.
Breierova et al., "An Introduction to Sensitivity Analysis," Publsihed by Massachusetts Institute of Technology, Cambridge, MA, Oct. 2001, pp. 67.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Griffith, Daniel A., "A Generalized Huff Model," Geographical Analysis, Apr. 1982, vol. 14, No. 2, pp. 135-144.
Hibbert et al., "Prediction of Shopping Behavior Using a Huff Model Within a GIS Framework," Healthy Eating in Context, Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Microsoft, "How Word Creates and Recovers the AutoRecover files," <http://support.microsoft.com/kb/107686>, Article ID: 107686, printed Feb. 11, 2010 in 3 pages.
Microsoft, "Introduction to Versioning," <http://office.microsoft.com/en-us/sharepointtechnolgy/HA010021576.aspx?mode=print>, 2007 in 3 pages.
Microsoft, "Managing Versions and Checking Documents In and Out (Windows SharePoint Services 2.0)," <http://technet.microsoft.com/en-us/library/cc287876.aspx>, Aug. 22, 2005 in 2 pages.
Schwieger, V., "Sensitivity Analysis as a General Tool for Model Optimisation-Examples for Trajectory Estimation," 3rd IAG/12th FIG Symposium, Baden, Germany, May 22-24, 2006, Published by IAG, 2006, pp. 10.
Schwieger, V., "Variance-Based Sensitivity Analysis for Model Evaluation in Engineering Surveys," INGEO 2004 and FIG Regional Central and Eastern European Conference on Engineering Surveying, Nov. 11-13, 2004, Published by INGEO, Bratislava, Slovakia, 2004, pp. 10.
Traichal et al., "Forecastable Default Risk Premia and Innovations," Journal of Economics and Finance, Fall 1999, vol. 23, No. 3, pp. 214-225.
UMBC CMSC 341 Introduction to Trees dated Aug. 3, 2007.
YAHOO, <http://web.archive.org/web/20020124161606/http://finance.yahoo.com/q?s=%5eIXIC&d=c...> printed Mar. 6, 2012 in 2 pages.
Official Communication for New Zealand Patent Application No. 628840 dated Aug. 28, 2014.
Definition "Identify" downloaded Jan. 22, 2015, 1 page.
Definition "Overlay" downloaded Jan. 22, 2015, 1 page.
Official Communication for New Zealand Patent Application No. 622513 dated Apr. 3, 2014.
W. Dreyer et al., "An Object-Oriented Data Model for a Time Series Management System," IEEE 1994, pp. 10 pages.
G. Mentzas et al., "An Architecture for Intelligent Assistance in the Forecasting Process," Proceedings of the 28th Annual Hawaii International Conference on System Sciences, 1995, 10 pages.
Notification of International Search Report and Written Opinion, PCT/US2009/056738, Applicant: Palantir Technologies, Inc., dated Mar. 29, 2010, 11 pages.
Current Claims, PCT/US2009/056738, 11 pages.

* cited by examiner

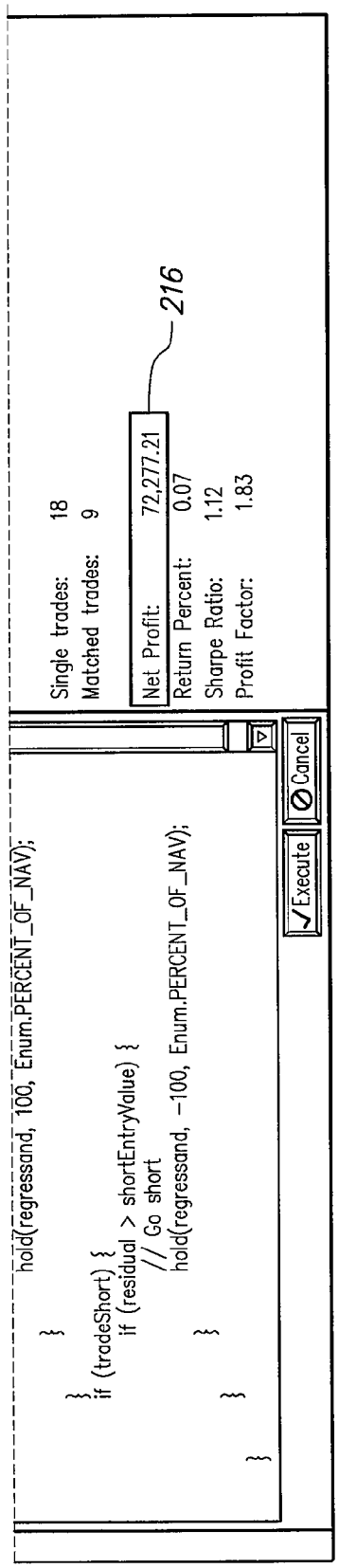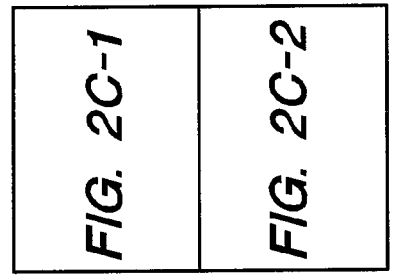
FIG. 2C-2
FIG. 2C-1 | FIG. 2C-2
FIG. 2C

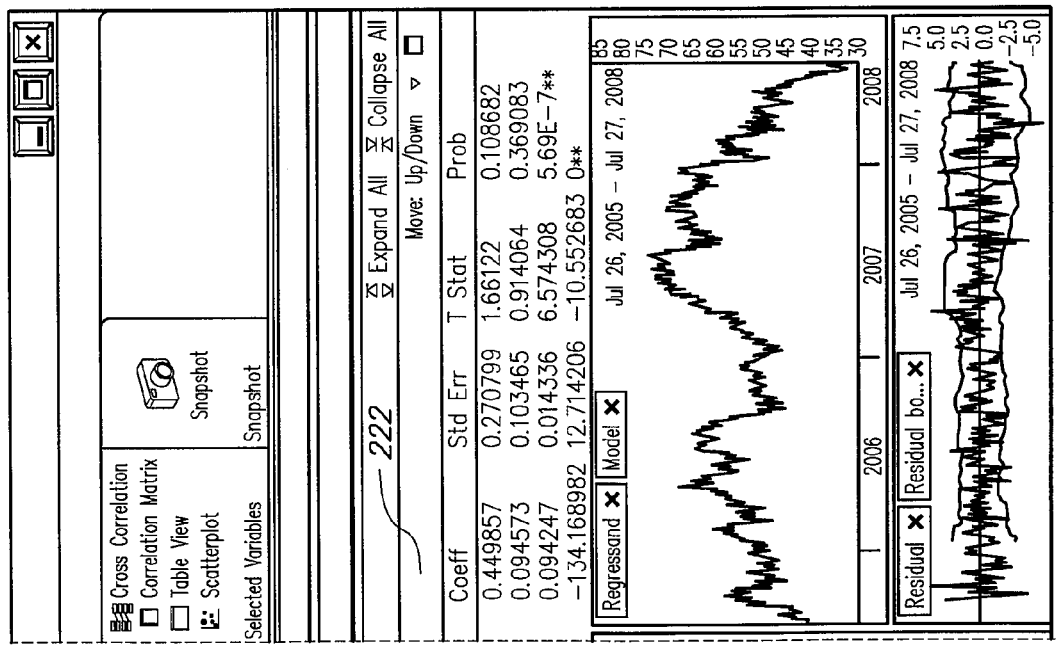

FIG. 2F

OBJECT MODELING FOR EXPLORING LARGE DATA SETS

CROSS-REFERENCE TO RELATED APPLICATION

This application claims the benefit of priority to and is a divisional of application Ser. No. 12/210,947, filed Sep. 15, 2008 now abandoned; the entire contents of which are hereby incorporated by reference for all purposes as if fully set forth herein.

FIELD OF THE DISCLOSURE

The present disclosure generally relates to techniques for exploring large data sets, for example, as related to market instruments.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data processing systems can be programmed to facilitate analysis of a universe of data items. A universe of data items refers to a large collection of data items. An example of such a universe may be a large collection of market instruments. In many instances, the amount of raw data about data items can be massive and dynamically increasing all the time. Under some approaches, an analyst relies on empirical knowledge and cumbersome spreadsheets to analyze markets and instruments. Under some other approaches, markets and instruments are modeled as multi-variable stochastic, predictive systems. In all these approaches, however, what has been captured is often over-simplified and relatively static. These approaches cannot keep up with new variable and new trends appearing in the markets, and therefore can hardly yield reliable insights for future performance of the markets and instruments. These shortcomings are made worse, as these approaches typically provide little support for a user to flexibly model the markets, to promptly react to new trends, and to timely test new hypotheses.

SUMMARY

The present disclosure is directed to a programmatic object model that facilitates analysis of universes of data items.

A first claim of the disclosure is an object model that facilitates performing financial analysis and that includes certain zero-order objects or building blocks that lend themselves particularly well to doing financial analysis. The object model comprises a universe of data items, relationships between the data items, higher-order objects generated based on one or more data items in the universe, higher-order objects generated based on other objects, and auxiliary entities related to the universe of data items.

A second claim is that some of the building blocks are "zero-order", in that they cannot be decomposed into other building blocks. Examples of zero-order building blocks are time series, metrics, and financial instruments. A time series is an object that represents time-dependent information. A metric building block represents a type of data transformation; for example, a metric defines a function that receives an instrument as input and produces a time series as output. A financial instrument building block represents any market entity that is traded or otherwise of interest, such as an equity, a currency, or a bond.

A third claim is that some of the building blocks can be decomposed into other building blocks. Examples include a date set, index, portfolio, strategy, instrument group, and regression. For example, a date set comprises time values that satisfy one or more selection criteria; an instrument group comprises one or more instruments selected from a universe of instruments using a filter chain; an index indicates a collective value of one or more instruments; a regression transforms one or more first time series into a predicted time series and compares the predicted time series with a second time series; a portfolio comprises zero or more time series each of which represents an instrument, a particular date set, and one or more trades that refer to times represented in the particular date set; a strategy comprises a date set that represents a time period and a statement block that can be executed to determines one or more trades of the instrument.

Additional claims of the disclosure relate to how the foregoing higher-order building blocks can be decomposed into the zero-order building blocks. For example, an index comprises an instrument group and a metric and a date set; an instrument group comprises filters; and a filter can be a set of instruments and a metric.

In embodiments where data items are instruments (in equity, currency and bonds), zero-order objects may refer to instruments, economic indexes, time series and meta data associated with instruments, and other information that are cataloged and stored in a database for the purpose of being analyzed by the data analysis system.

Other embodiments may comprise a system and one or more machine-readable storage media operable to provide the foregoing graphical user interface and/or to perform or cause the performance of the foregoing computer-implemented methods.

BRIEF DESCRIPTION OF THE DRAWINGS

FIG. 2A illustrates an example graphical user interface related to a date set.

FIG. 2B illustrates an example graphical user interface related to an instrument group.

FIG. 2F illustrates an example graphical user interface related to a custom metric.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1 Glossary of Terms

In this disclosure the following terms have the following meanings:

Data item: a zero-order object that can be described by a number of properties and/or metrics.

Higher-order objects: the term "higher-order objects" refers to objects that can be built directly or indirectly on top of zero-order objects such as instruments.

Metric: a type of transformation. The metric performs the type of transformation specified, e.g., using the instrument as input, and produces the time series. In some embodiments, the identifier for the object and the token for the type of transformation are separated by a suitable delimiter such as a period.

Object model: a model that comprises a universe of data items, relationships between the data items, higher-order objects generated based on one or more data items in the universe, higher-order objects generated based on other objects, and auxiliary entities related to the universe of data items.

Ontological relationships: structural relationships existing among zero-order objects (such as economic indexes, instruments, etc.). The instruments can be classified based on ontological relationships, thereby forming a hierarchy on which the object model can be further built. In some embodiments, this hierarchy may comprise one or more economic indexes, which is not specifically tied to an instrument.

Time series: a type of objects which are used in the object model to represent time-dependent information.

Universe of data items: a large collection of data items, typically everything known to a particular system.

Zero-order objects: leaf nodes in the object model. In embodiments where data items are instruments (in equity, currency and bonds), zero-order objects may refer to instruments, economic indexes, time series and meta data associated with instruments, and other information that are cataloged and stored in a database for the purpose of being analyzed by the data analysis system.

2 Example Data Analysis System

Figure 1:
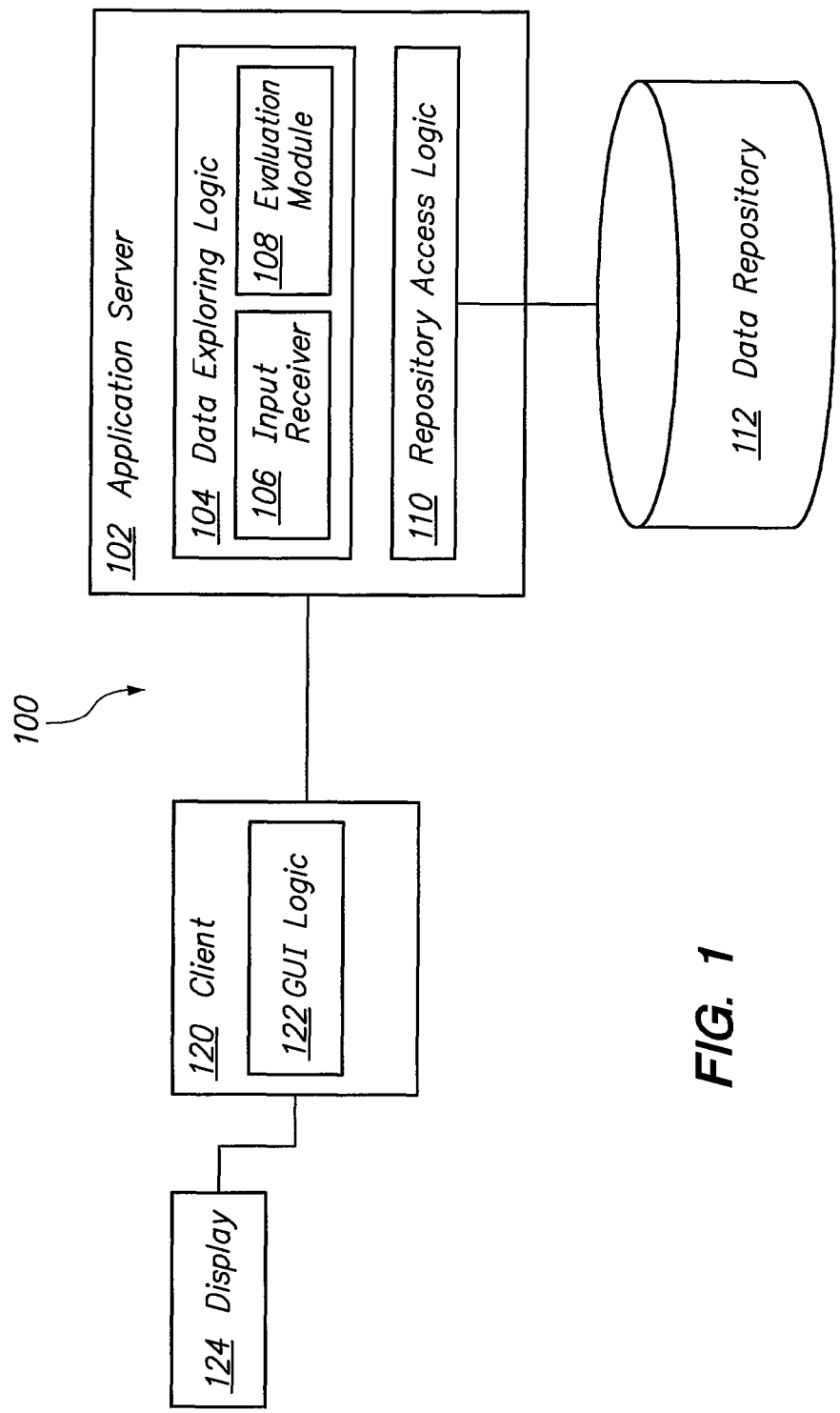
FIG. 1 illustrates an example data analysis system for exploring a universe of data items.

FIG. 1 illustrates an example data analysis system for exploring a universe of data items. Data analysis system 100 comprises application server 102 and one or more clients, such as client 120.

Figure 4:
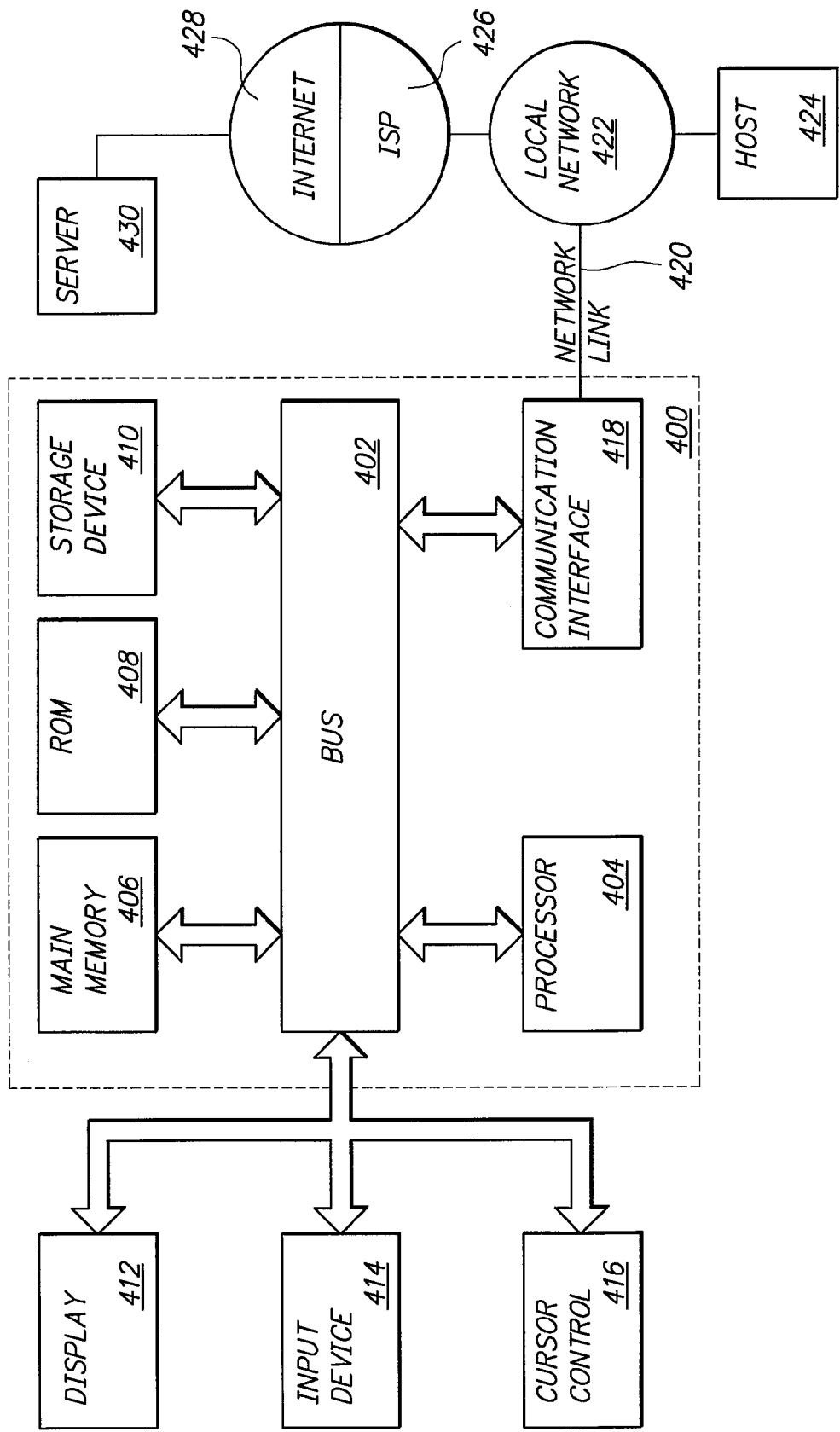
FIG. 4 illustrates a computer system with which an embodiment may be implemented.

In the embodiment illustrated in FIG. 1, client 120, which may be implemented by one or more first physical computing devices, is communicatively connected to application server 102, which may be implemented by one or more second physical computing devices, over a network. In some embodiments, each such physical computing device may be implemented as a separate computer system as shown in FIG. 4. For example, client 120 may be implemented in a computer system as a set of program instructions recorded on a machine-readable storage medium, while application server 102 may be implemented in a different computer system. Client 120 comprises graphical user interface (GUI) logic 122. GUI logic 122 may be a set of program instructions which, when executed by one or more processors of the computer system, are operable to receive user input and to display a graphical representation of one or more graphic constructs related to exploring a universe of data items using the approaches herein. GUI logic 122 may be operable to receive user input from, and display the graphic constructs to, a graphical user interface that is provided on display 124 by the computer system on which client 120 executes.

In some embodiments, GUI logic 122 is omitted. For example, in one embodiment, client 120 may comprise an application program or process that issues one or more function calls or application programming interface (API) calls to application server 102 to obtain information resulting from, to provide input to, and to execute along with application server 102, the processes or one or more steps thereof as described herein. For example, client 120 may request and obtain a representation of zero-order objects such as instruments, higher-order objects such as date sets, indexes, instrument groups, etc., higher-order objects, and other constructs as described herein using a programmatic interface, and then the client may use, process, log, store, or otherwise interact with the received data according to local logic. Client 120 may also interact with application server 102 to provide input, definition, editing instructions, expressions related to one or more objects or constructs as described herein using a programmatic interface, and then the application server 102 may use, process, log, store, or otherwise interact with the received input according to application server logic.

Application server 102 may be implemented as a special-purpose computer system having the logical elements shown in FIG. 1. In an embodiment, the logical elements may comprise program instructions recorded on one or more machine-readable storage media. Alternatively, the logical elements may be implemented in hardware, firmware, or a combination.

When executed by one or more processors of the computer system, logic in application server 102 is operable to explore the universe of data items according to the techniques described herein. In one embodiment, application server 102 may be implemented in a Java Virtual Machine (JVM) that is executing in a distributed or non-distributed computer system. In other embodiments, application server 102 may be implemented as a combination of programming instructions written in any programming language (e.g. C++ or Visual Basic) and hardware components (e.g. memory, CPU time) that have been allocated for executing the program instructions.

In an embodiment, application server 102 comprises repository access logic 110 and data exploring logic 104. Repository access logic 110 may comprise a set of program instructions which, when executed by one or more processors, are operable to access and retrieve data from data repository 112. For example, repository access logic 110 may be a database client or an Open Database Connectivity (ODBC) client that supports calls to a database server that manages data repository 112. Data repository 112 may be any type of structured storage for storing data including, but not limited to, relational or object-oriented databases, data warehouses, directories, data files, and any other structured data storage.

In the embodiment illustrated in FIG. 1, data exploring logic 104 comprises input receiver 106 and evaluation module 108. Data exploring logic 104 may be object-oriented logic. As used herein, the universe of data items can be accessed and/or operated on by the data exploring logic 104 to create, modify, delete, and store the data generated or used by data analysis system 100.

In an embodiment, input receiver 106 is a set of program instructions which, when executed by one or more processors, are operable to receive input from a client.

Evaluation module 108 is a set of program instructions that implement logic to create, modify, delete and store objects that are associated with the universe of data items, evaluate these objects when instructed to do so by data analysis system 100, provide the evaluation results to a client. Evaluation results of one or more objects may also be rendered by GUI logic 122 on display 120.

3 Examples of Zero-Order Objects

3.1 Instruments

An instrument is an object that represents any market traded financial entity or product of interest, such as a stock (equity), bond, currency, or fund.

3.2 Metrics

A metric is a transformation (or function) that receives one type of data (e.g., an object such as an instrument) and returns another type (e.g., another object such as a time series). A metric may perform any form of specified processing, specified computation, related operations such as database queries, network communications and data storing. For example, a metric may receive a particular instrument as input and return a time series of the particular instrument's volume. A metric may also receive one time series for an instrument and return the value of the instrument on a given day. A metric may optionally receive parameters at runtime that influence the execution of logic implemented in the metric. An example of a parameter that can be inputted into a metric to influence the execution of a metric may be a number of days to show a moving average price for MSFT where the metric calculates the moving average price.

Objects that are of a higher order than a zero order can be built using metrics. The input objects and the output objects can be zero-order or higher-order in any combination.

The data changes over time. Therefore, if a metric is evaluated at two different times, it may produce different outputs. Alternatively, output objects from one or more of these metrics may be pre-computed/evaluated and stored/cached beforehand. In some embodiments, parameters may be provided to a metric to specify whether a cached object of a metric should be used as input, or whether the output of a metric should be cached or stored.

3.3 Time Series

A time series is a programmatic object that represents time-dependent information in any of several forms, including a series of discrete dates or a sequence of time-related values. Where an object model contains a large amount of time-dependent information, many time series may be created in the process of evaluating objects in the object model. For example, an instrument may have a trading history that indicates its values over a period of time. From this trading history (e.g., raw trading data), one or more time series may be created to represent time-dependent information, in any desired resolution (for example, in a time scale of years, months, weeks, days, hours, minutes, seconds).

In some embodiments, a time series may comprise a set of numeric values and a separate set of time values, wherein each numeric value has a corresponding time value in the set of time values. Each such numeric value represents a value of a certain entity at each corresponding time value in the set of time values. For example, a time series may be used to represent market values of an instrument. The above-mentioned "value of a certain entity" may be a particular market value at the closing of a trading day. In this example, the time series may comprise a set of long or double values, each of which represents a market value at the closing of a corresponding day as indicated by a time value in a separate set of time values. The time series further comprises the separate set of time values representing the closings of all corresponding days, for which market values of the instruments are included in the set of long or double values.

A time series may also be used to represent values of an entity for time values that meet certain criteria. For example, a time series may be used to represent market values for an instrument when the instrument is traded to higher prices, when the instrument is traded to lower prices, when the volatility of the instrument exceeds a certain limit, when the volatility of the instrument stays below a certain limit, or a derivative of other time series. Furthermore, the values of an entity are not limited to market values of an instrument. For example, the values of an entity, as represented by a time series, may comprise analytical values of historical volatility of two instruments.

In some embodiments, a time series associated with an instrument may be accessed by an expression containing an identifier (e.g., the identifier "GOOG" to indicate the equity instrument for Google, Inc.) for another object such as an instrument and a token (e.g., a textual name such as "HVOL" representing historical volatility of an instrument) for a type of transformation. In the present example where the time series is accessed by the expression "GOOG.HVOL", the metric identified by the token (e.g., "HVOL") receives the identifier for the instrument (e.g., "GOOG") as input and transforms raw trading data of the instrument (i.e., "GOOG") into a time series as an output object. This time series, for example, may represent time-dependent information of volatility of the instrument "GOOG" in all recorded trading days.

A time series such as described above may be further transformed along with other parameters into another output object.

A time series can not only represent time-dependent information for zero-order objects such as instruments, but may also represent time-dependent information for any higher-order objects in the object model.

In some embodiments, a time series may be used to represent time-dependent information that is not related to another object. For example, a set of time values from a calendar, e.g., all week days, all work days, all Mondays, or the second days of months, may be transformed by a metric into a time series. Such a time series may be viewed as an object per se as it is independent of another object such as an instrument. In some embodiments, the time series may be accessed within a global scope, by any other objects, without naming any other object such as an instrument. In some embodiments, a time series may comprise a set of time values (e.g., all Mondays) without including a separate set of numeric values representing values of an entity that may be associated with another object such as an instrument.

In some embodiments, time series may be pre-computed (evaluated) and stored/cached.

4 Example Higher-Order Objects

4.1 Date Set

A date set comprises a set of time values that satisfy one or more selection criteria. As used herein, the term "time value" may include date and/or time of day information at various resolutions, for example, from multiple years to sub-seconds. For example, a date set may be all trading days when the "GOOG" stock trades up. A date set may also have an explicit start time value for the set, for example, Jan. 1, 2006; thus, the date set excludes all time values that are before the explicit start time value. Similarly, a date set may also have an explicit end time value; thus, the date set excludes all time values that are after the explicit end time value.

A date set may also take an implicit start time value, where an explicit start time value is not specified. For example, a date set that comprises all days when the "GOOG" stock trades up may have an implicit start time value when the "GOOD" stock was first publicly traded. Similarly, a date set may also take an implicit end time value, where an explicit end time value is not specified. For example, a date set that comprises all days when the "ENE" stock was available for trades may have an implicit end time value when the "ENE" stock was terminated from public trading from the New York Stock Exchange.

One of several object creation mechanisms may be used to create higher-order objects such as date sets. One object creation mechanism is a metric. This metric may take a first input that specifies a time series. This time series is generally a set of date/value pairs. The date set metric also may take a second input that specifies one or more criteria. For example, the one or more criteria as specified in the second input may specify a range. The resulting date set will then contain all the dates as indicated by the time series that are within the specified range.

Another object creation mechanism to create a higher-order object such as a date set is to directly use a programming language such as JAVA. The user may supply programming language code to the system 100, which may be compiled, interpreted or otherwise executed by the system 100 to create a date set. Extension mechanisms such as Java reflection may be used to add code segments or objects to the system so that the object creation mechanisms can be dynamically extended.

Yet another object creation mechanism to create a higher-order object such as a date set is to interact with a user interface. For example, tools or widgets may be provided in or through a graphical user interface and may interact with the user for the purpose of creating a date set.

In various embodiments, these and other object creation mechanisms, or a combination thereof, may be used to create various higher-order objects.

Figure 2A:
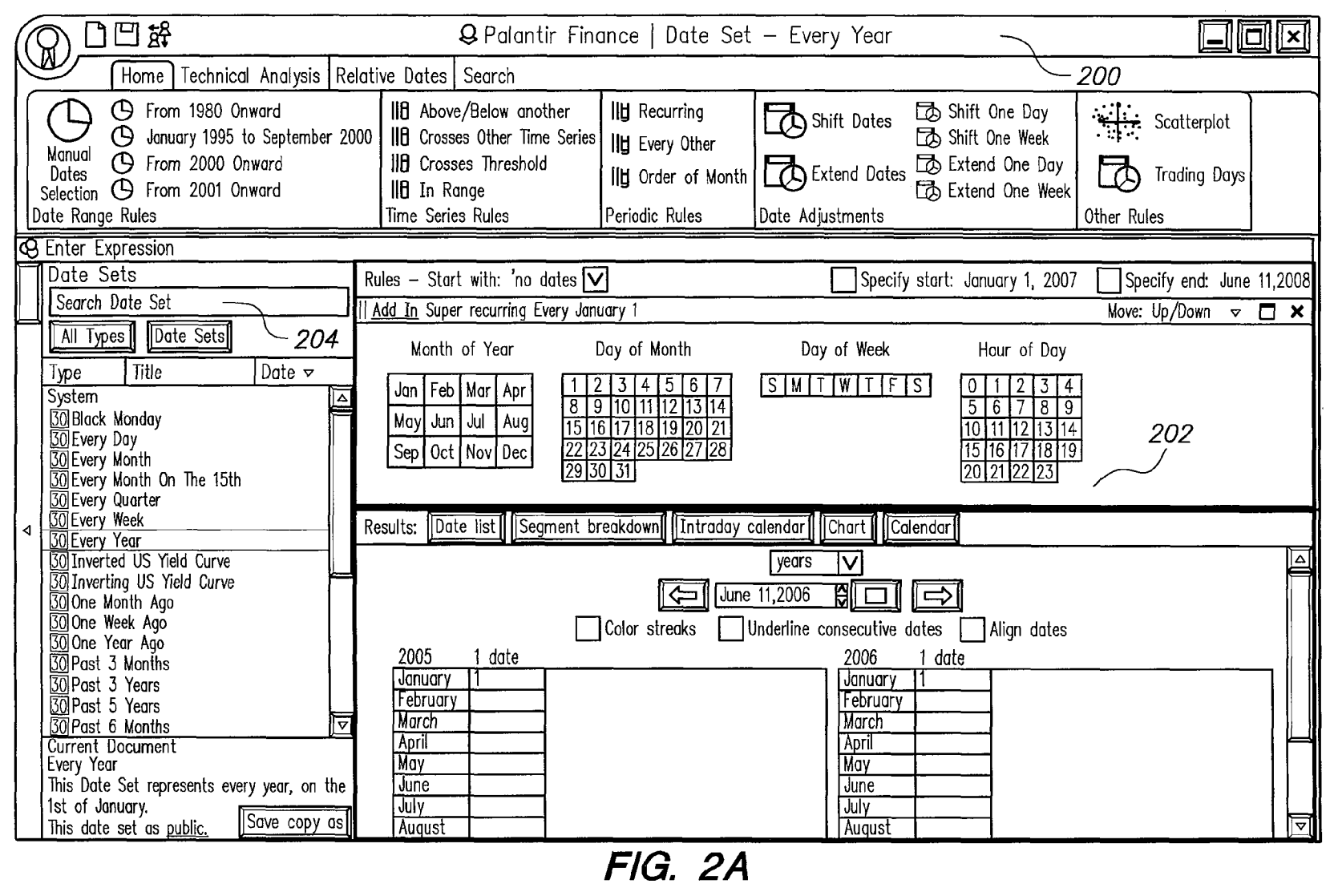

A date set may or may not be related to any other object. For example, as shown in FIG. 2A, a date set may be hard-coded by a user at client 120. For example, a calendar 202 may be shown at client 120. Graphic components may be rendered on a graphical user interface 200 so that the user may select certain time values (i.e., the user selection provides the second input that specifies one or more criteria) using calendar 202 (which is the first input that specifies a time series). With calendar 202 and the user selection as inputs, an object creation mechanism creates and outputs the corresponding date set.

For a generated date set, the user may provide a token in the form of a string to this date set in a text input box 204. Subsequently, this date set may be used in combination with other objects. In an embodiment, any of all the entities that are involved in specifying, creating and outputting a new date set may be stored in a machine-readable storage medium. In addition, the new date set may also be stored or cached in such a medium.

4.2 Index

An index indicates a collective value of one or more instruments as a function of time over a set of time values. A collective value is any type of aggregate value of the one or more instruments. The collective value may be of a market value type such as a total monetary value of the one or more instruments traded at public exchanges, or of an analytical value type such as a numeric value indicating volatility of the trading price for the one or more instruments, as a function of time over the set of time values.

For the purpose of illustration only, the one or more instruments included in the index may comprise the "GOOG", "YHOO", and "MSFT" stocks. Hence, the index may be an aggregate market value of these stocks, as a function of time over all trading days since Jan. 1, 2007. A market value is an aggregation of values of all assets included in the portfolio at a corresponding time value in the set of time values. The market value may be measured (e.g., denominated) in a reference currency such as the U.S. dollar. For example, a value of an asset such as an instrument may be a trading price of that instrument at the closing of a particular trading day. A value of the reference currency may be its trading value as denominated in the reference currency. A value of a currency that is not the reference currency may also be measured in the reference currency through an exchange rate.

An index may have a start time value, for example, Jan. 1, 2007; thus, the index does not track the collective value before the start time value. Similarly, an index may also have an end time value; thus, the index does not track the collective value after the end time value. The start time value and/or the end time value may be explicit or implicit.

To create an index, any of the object creation mechanisms may be used. An object creation mechanism may take a first input that specifies one or more time series for the one or more instruments. For example, these time series as specified in the first input may represent trading prices for the "GOOG", "YHOO", and "MSFT" stocks on all trading days when the stocks are publicly traded. The object creation mechanism also may take a second input that specifies a date set. In some embodiments, the date set as specified in the second input may specify a set of days for which a collective value of the one or more instruments should be tracked. For example, the date set may comprise a set of last five trading days of each quarter since Jan. 1, 2007. The object creation mechanism may comprise logic to compute the collective value of the one or more instruments as specified in the first input over the set of time values as specified in the second input. The object creation mechanism may create and output an index in the form of a new time series. Each numeric value in the set of longs or doubles indicates the collective value of the "GOOG", "YHOO", and "MSFT" stocks at a time value (e.g., a day) in the set of last five trading days of each quarter since Jan. 1, 2007.

The user may provide a token in the form of a string to name the index so that the definition or computed value of the index can be subsequently referenced as a named object in combination with other objects. In an embodiment, any of all the entities that are involved in specifying, creating and outputting a new index may be stored or cached in a machine-readable storage medium. In addition, the definition of new index may also be stored or cached in such a medium.

4.3 Instrument Group

An instrument group comprises one or more instruments selected from a universe of instruments using a filter chain that is created from zero or more set operations and one or more filter links. For example, an instrument group may comprise all the stocks in the S&P Index ("SPX") that are in the technology sector. Another example of instrument group may be all the stocks in the financial sector of the S&P Index that have low PE ratios.

Figure 2B:
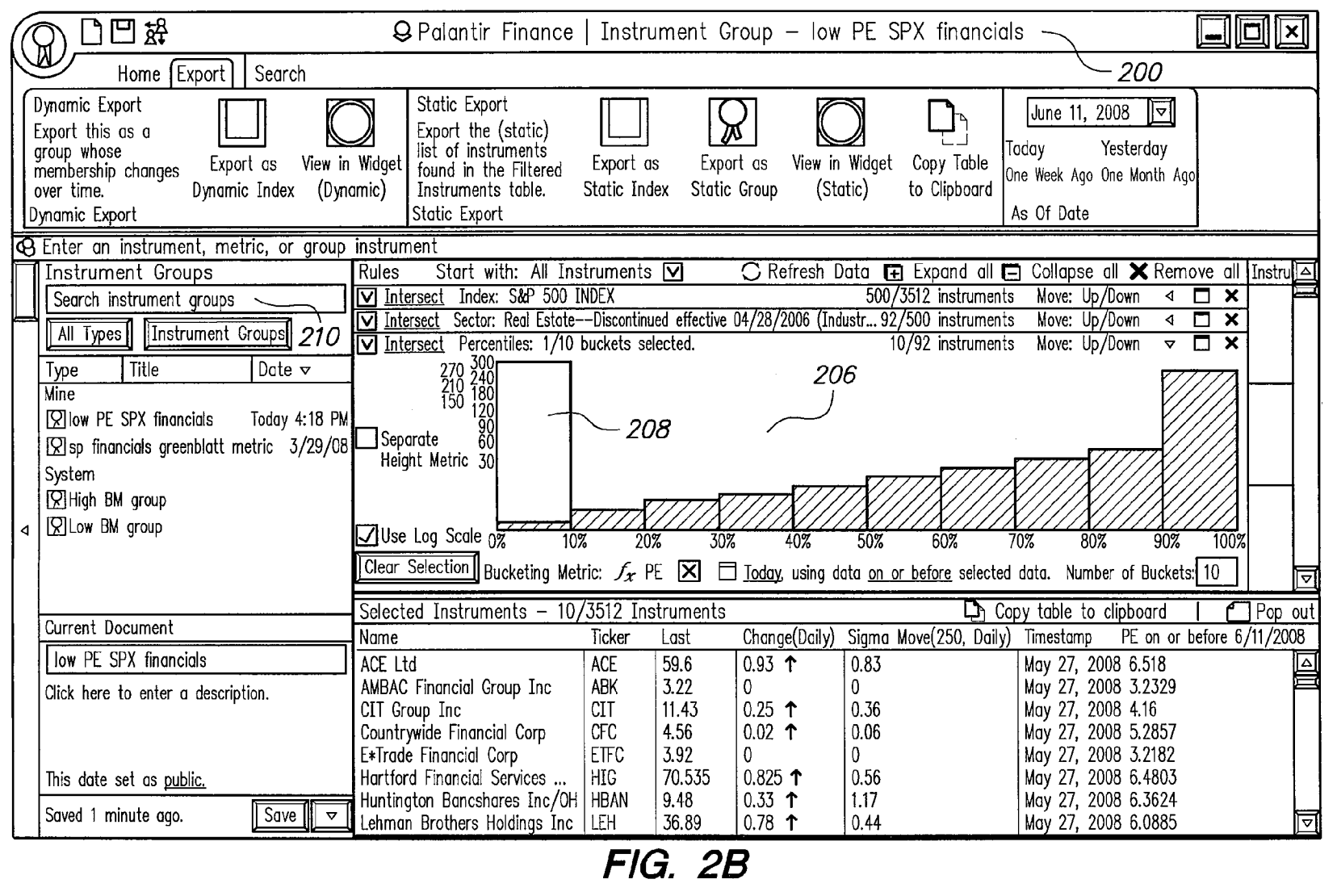

To create an instrument group, an object creation mechanism may be used. This mechanism may take a first input that specifies the zero or more set operations. For example, a set operation of "intersection" may be specified as the first input. The object creation mechanism also may take a second input that specifies the one or more filter links. For the purpose of illustration only, such a filter link may be a criterion that any selected stock must belong to the bucket of lowest 10% among an input set of instruments. In some embodiments, graphical user interface 200 of client 120 may be used to create an instrument group, as shown in FIG. 2B. A filter view 206 may be used to represents an input set of instruments to which a filter link may be applied. In this example, all stocks in the financial sector of the S&P Index are used as an input set of instruments. These stocks are represented in an n-tile diagram. This n-tile diagram comprises n (a positively integer such as ten) buckets, each bucket comprising substantially a same number of instruments. Each bucket represents a particular range of 10% PE ratios. Thus, if a stock is in the top 10% among all the stocks in terms of PE ratios, the stock will be included in the bucket between 90% and 100%. Similarly, if a stock is in the bottom 10% among all the stocks in terms of PE ratios, the stock will be included in the bucket between 0% and 10%. A user at client 120 may perform a range selection 208 to select a desire range of PE ratios. In the present example, the user selects the bottom 10% of PE ratios.

The object creation mechanism may comprise logic to create a filter chain by evaluating each filter link in the filter chain, combining the filter link into the filter chain based on the set operation specified, and generate the instrument group that comprises the one or more instruments. In the present example, where the filter link is created using an u-tile diagram. the object creation mechanism may create and output an instrument group that comprises a set of instruments that are in the bottom 10% of PE ratios as indicated in FIG. 2B.

The user may provide a token in the form of a string to name the instrument group. For example, this instrument group as illustrated in FIG. 2B may be called "low PE SPX Financials." In some embodiments, a text input box 210 may be provided in graphical user interface 200 to accept input of the string. Subsequently, this named instrument group may be used in combination with other objects by a reference to the token.

In an embodiment, any of all the entities that are involved in specifying, creating and outputting a new instrument group may be stored or cached in a machine-readable storage medium. In addition, the new instrument group may also be stored or cached in such a medium.

4.4 Portfolio

A portfolio indicates a market value of included assets as a function of time over a set of time values. A portfolio may comprise a start time value from which the market value of the portfolio is to be tracked. A portfolio may optionally comprise an end time value after which the market value of the portfolio is no longer tracked. The set of assets included in the portfolio at any given time value may comprise a variable number of instruments. The set of assets may optionally include a certain amount in various currencies (including currency equivalents).

To create a portfolio, an object creation mechanism may be used. This mechanism may take a first input that specifies zero or more time series for the zero or more instruments. For example, these time series as specified in the first input may represent trading prices for the "GOOG", "YHOO", and "MSFT" stocks on all trading days when the stocks are publicly traded. In some embodiments, the object creation mechanism may use weight factors to determine how much of each of these instruments is to be hold in the portfolio at each time value of a time period starting from the start time value. The object creation mechanism also takes a second input that specifies a date set. In some embodiments, the date set as specified in the second input specifies a set of time values (e.g., the preceding time period) for which a market value of the portfolio should be computed. For example, the date set may comprise a set of all trading days since Jan. 1, 2007. The object creation mechanism may further take a third input that specifies the one or more trades over the set of time values as specified in the second input. Each trade may specify an instrument, a buy-or-sell indication, a time of trading, and a quantity. The object creation mechanism may comprise logic to execute, or to simulate execution of, trades as specified in the third input and to compute the market value of the portfolio over the set of time values as specified in the second input, thereby giving rise to a new portfolio object. Any other metric may be applied to the new portfolio object to extract information. In addition, the portfolio object may be used to create another higher-order object. In the present example, the associated set of time values to which the long or double values are mapped is the set of time values specified in the second input. For example, each numeric value in the set of longs or doubles indicates a collective market value of all assets in the portfolio at a time value in the set of all trading days since Jan. 1, 2007.

The user may provide a token in the form of a string to name the portfolio so that a subsequent reference can be made to the token in an expression that involves other objects.

In an embodiment, any of all the entities that are involved in specifying, creating and outputting a new portfolio may be stored or cached in a machine-readable storage medium. In addition, the new portfolio may also be stored or cached in such a medium.

4.5 Strategy

Figures 1, 2C:
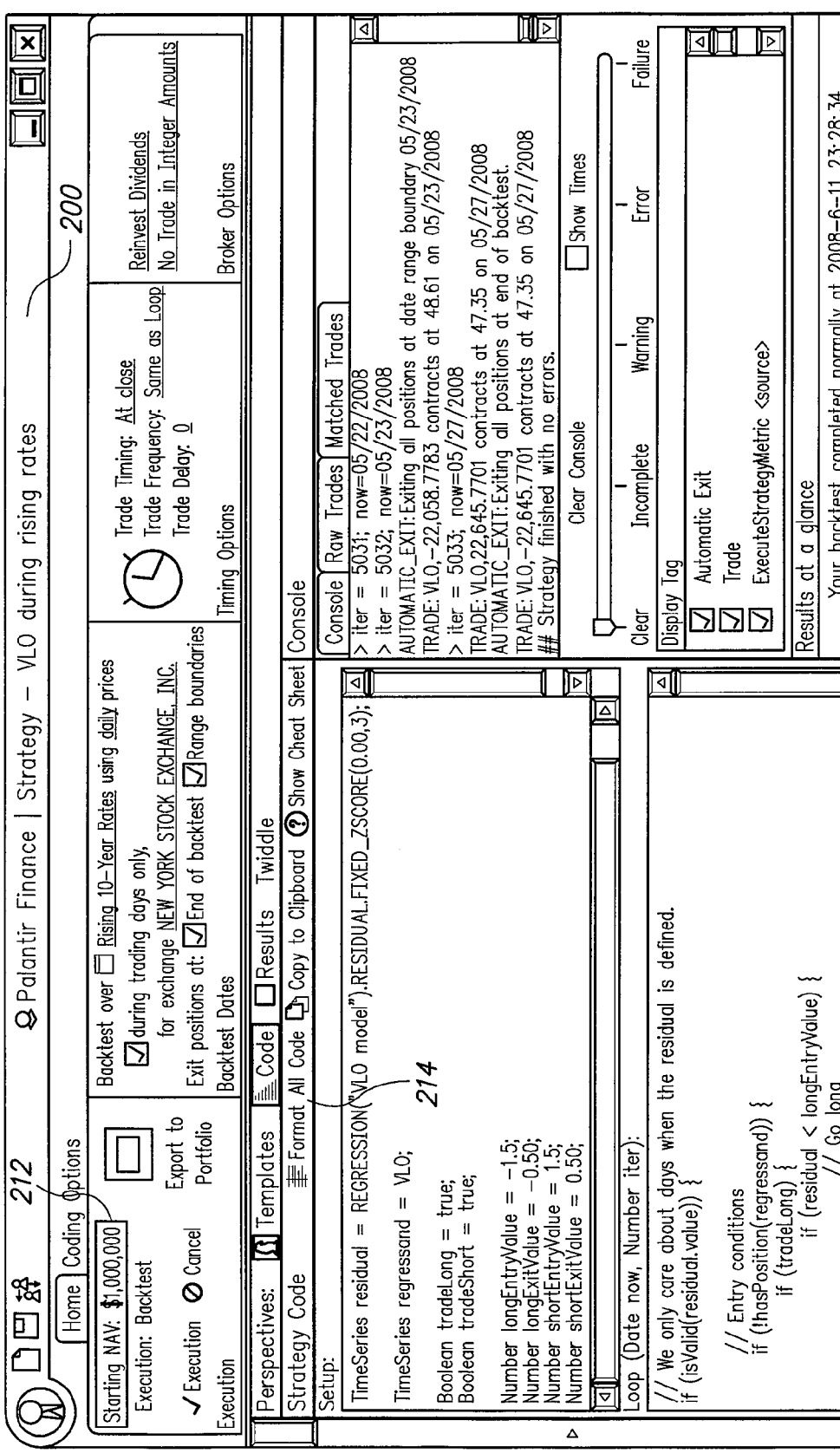
FIG. 2C illustrates an example graphical user interface related to a strategy.

A strategy, as illustrated in FIG. 2C, may be used to generate a net profit in a time period. A net profit in a time period is a net gain or loss at the end of the time period. Here, the net profit may be determined by a number of trades executed within the time period and market conditions. A block of strategy code may be used to generate the trades that are to be executed in connection with the strategy. In some embodiments, the net profit and the trades may be hypothetical and generated for the purpose of studying, validating or invalidating a particular trading strategy.

The time period may be represented by a date set that comprises a starting time value corresponding to the beginning of the time period and optionally an end time value corresponding to the end of the time period.

In some embodiments, a strategy comprises an initial collection of assets at the beginning of the time period. In a particular embodiment, this initial collection of assets may comprise only a starting net asset value (212 of FIG. 2C) in a reference currency such as the U.S. dollar.

To create a strategy, an object creation mechanism may be used. This object creation mechanism may take a first input that specifies a particular date set. Comprising a start time value and optionally an end time value as previously described, the particular date set represents a time period where trades may be generated and executed. For example, the date set may be all trading days from Jan. 1, 2006 to now. Alternatively, the date set may be all trading days when the "GOOG" stock trades up.

The object creation mechanism may take a second input that specifies a statement block, which when executed generates one or more trades. Each trade may specify an instrument, a-buy-or-sell indication, a time of trading, and a quantity. For the purpose of illustration, the statement block may be displayed in a content pane 214 on graphical user interface 200 in FIG. 2C. The object creation mechanism may comprise logic to execute, or to simulate execution of, the statement block and the trades as generated by the statement block and to compute the market value of the strategy over the set of time values as specified in the first input, thereby creating a new strategy object. Any other metric may be applied to the new strategy object to extract information. In addition, the strategy object may be used to create another higher-order object. Furthermore, the object creation mechanism may create and output a net profit at the end of the time period. In the present example, the object creation mechanism may create and output a net profit of 72,277.21 in the reference currency of US dollar, as illustrated in 216 of FIG. 3C.

The user may provide a token in the form of a string to name the strategy. For example, the strategy in FIG. 2C may be named as "VLD during rising rates", as indicated in the title bar of graphical user interface 200 of FIG. 2C. Subsequently, this strategy may be used to create other higher-order objects.

In an embodiment, any of all the entities that are involved in specifying, creating and outputting a new strategy may be stored or cached in a machine-readable storage medium. In addition, the new strategy may also be stored or cached in such a medium.

A user may interact with graphical user interface 200 to test a trading strategy. For example, a statement block may be supplied (e.g., pasted) into content pane 214 of FIG. 2C and executed to create and output a net profit at the end of the time period. Other statement blocks corresponding to various strategies of investment may also be tested by supplying each of the other statement blocks into content pane 214 of FIG. 2C for execution of trades. For example for the purpose of comparing between different trading strategies within the same time period and with the same starting net asset value may be tested in this manner.

For the purpose of illustration only, the statement block that is to be executed by a strategy (object) may comprise one or more rules that can be used to determine the one or more trades, as illustrated below:

```
Setup code:
----------------------------------------
//   A Strategy based on the idea that an instrument that
     experiences large moves in
//   either direction tends to revert to a more normal
     value. Buy the instrument
//   when it crosses its lower Bollinger band; sell when it
     crosses its upper
//   Bollinger band; and always exit the position once it
     returns to its moving
//   average.
TimeSeries series = SPX;
Number days = 80;
Number stddev = 2.0;
TimeSeries lowerBollingerBand =
series.bollingerSingle(days, -1*stddev);
TimeSeries upperBollingerBand =
series.bollingerSingle(days, stddev);
TimeSeries mean = series.ma(days);
----------------------------------------
Loop code:
----------------------------------------
if (series.movesBelow(lowerBollingerBand)) {
   if (numContracts(series) <= 0) {
      hold(series, 100, Enum.PERCENT_OF_NAV);
   }
}
else if (series.movesAbove(upperBollingerBand)) {
   if (numContracts(series) >= 0) {
      hold(series, -100, Enum.PERCENT_OF_NAV);
   }
}
else if (series.movesAbove(mean) ||
   series.movesBelow(mean)) {
   exit(series);
}
```

This statement block as indicated in its comment section implements a trading strategy with rules of buying 100 units in SPX if SPX moves below its lower Bollinger band, selling 100 units if SPX moves above its upper Bollinger band, and exiting the position in SPX if SPX returns to its moving average.

4.6 Regression

Figures 1, 2D:
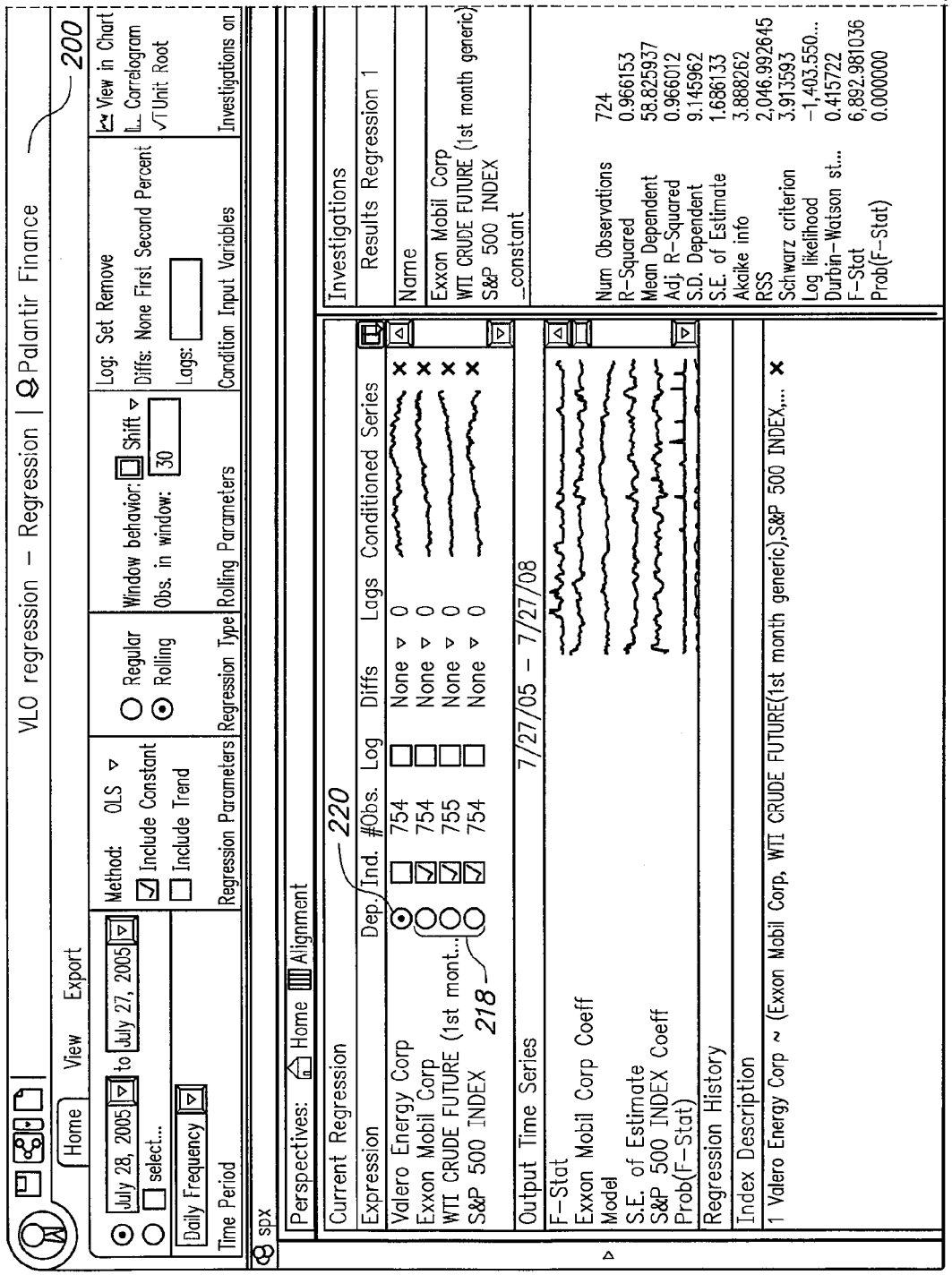
FIG. 2D illustrates an example graphical user interface related to a regression.

A regression, as illustrated in FIG. 2D, may be used to perform predictions, inferences and hypothesis analyses between independent time series and a dependent time series in the object model.

To create a regression, an object creation mechanism may be used. This object creation mechanism may take a first input that specifies one or more first time series representing independent variables in a regression analysis. For example, the one or more first time series may be ones that are associated with objects like "Exxon Mobil Corp", "WTI CRUDE FUTURE (1st month generic)", and "S&P 500 INDEX" in the object model, as indicated in 218 of FIG. 2D. The object creation mechanism also may take a second input that specifies a second time series representing a dependent variable in the regression analysis. The object creation mechanism may comprise logic to perform the regression analysis that transforms the one or more first time series into a predicted time series and compares the predicted time series with the second time series, thereby creating a new regression object. This new regression object may be used in part by another object creation mechanism to create other higher-order objects. The result of the regression analysis may be presented in a content pane 222 of FIG. 2D.

The user may provide a token in the form of a string to name the regression. Subsequently, this regression may be used in combination with other objects through a reference to its token.

In an embodiment, any of all the entities that are involved in specifying, creating and outputting a new regression may be stored or cached in a machine-readable storage medium. In addition, the new regression may also be stored or cached in such a medium.

5 Additional Example Higher-Order Objects

A user may define an arbitrarily complex object that is built on top of other objects. For example, liquidity and risk models may be built as a multi-level object on top of an instrument group, a portfolio, several indexes, a date set, etc. Similarly, an index may be built on top of other higher-order objects.

Figure 2E:
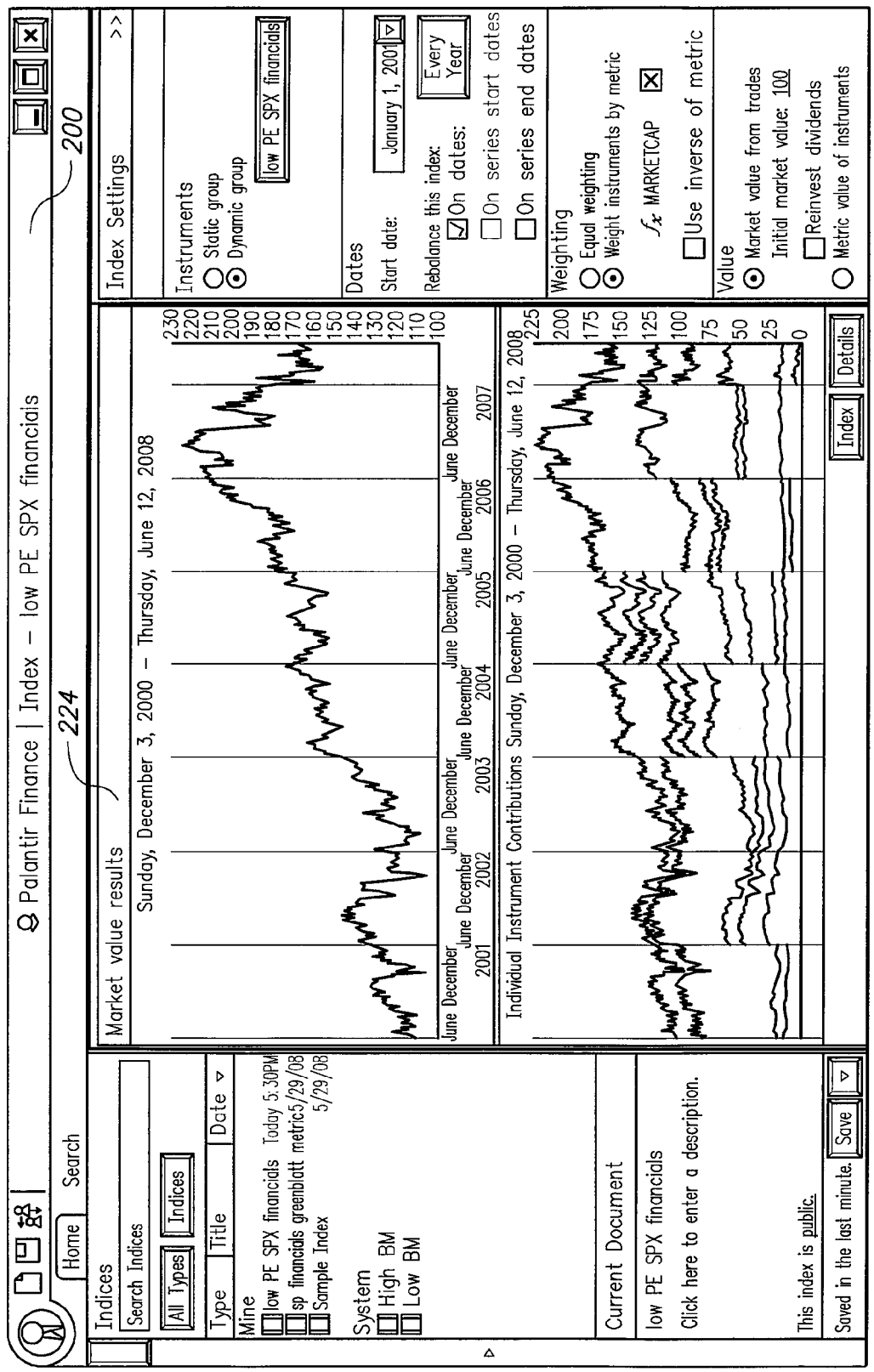
FIG. 2E illustrates an example graphical user interface related to an index.

FIG. 2E illustrates an index that is built on another higher-order object. The index may be built on top of one or more time series, all of which belongs to a higher-order object in the form of an instrument group. In other words, the instrument group, a higher-order object, is built on top of three time series associated with zero-order objects (e.g., instruments, economic index, etc.), while the index uses the instrument group as input. For the purpose of illustration only, the instrument group may be "low PE SPX Financials", as illustrated in FIG. 2B. As shown in FIG. 2E, a collective value for the instrument group may be tracked in the higher-order index and computed as a function of time over a time period. This function of time may be displayed in a content pane 224 of graphical user interface 200, as illustrated in FIG. 2E. In some embodiments, still higher-order indexes may be built on tope of other objects.

In some embodiments, a higher-order object may be represented as a tree. The leaf nodes of the tree are zero-order objects such as instruments. The tree may additionally and/or optionally contain non-leaf nodes. The non-leaf nodes are higher-order objects. In other words, a higher-order object may be built from building blocks. These building blocks may be zero-order or higher-order objects. For example, when an index is built from an instrument group, the instrument group also may be built from a combination of other higher-order and zero-order objects.

Any of several object creation mechanisms may be selected by a user for the purpose of creating a higher-order object. Definitions for the higher-order objects may be generated by the object creation mechanism and saved in the system. A definition may be defined and evaluated at two different times. The results of evaluation of a definition may change as underlying data changes. These results may be saved in cache or in permanent storage.

In some embodiments, types of objects in the object model may be implemented as classes in an object-oriented language such as JAVA®, thus allowing easy incorporation of various properties of one object into another.

6 Dynamic Specification of Objects

In accordance with an embodiment of the present invention, an input mechanism is provided for a user to enter expressions to the data analysis system for the purpose of instructing the data analysis system to create, modify, delete, evaluate, or save various objects and components in the object model. Here, the term "input mechanism" includes either a command line interaction mechanism or a graphic-user-interface based interaction mechanism, or a combination of the preceding two. In other embodiments, an input mechanism is not used and objects may be specified programmatically or at runtime using other mechanisms.

An expression may comprise one or more tokens separated by delimiter characters such as a period, parentheses, a comma, quotation marks, etc. Each token may refer to an economic index, an instrument, a metric, an input object, an output object, a parameter, a time series, a higher-order-object, or any higher-order object in the object model.

An expression may be evaluated with a certain order. For example, in a particular embodiment, the expression may be evaluated according to a precedence ordering among operators. Additionally and/or optionally, certain optimization logic may be used to determine whether any tokens in an expression can be evaluated in parallel.

Custom metrics and user-defined classes and objects can be provided to (or plugged into) the system and be immediately made available for use. In certain embodiments, a modeling language may be used to define custom metric objects. For example, a user may specify at a command line interface for creating a new type of object and provides to the data analysis system a token for this new type of object. The new type of object, for example, may be a new metric. However, a modeling language is not required, and the embodiments that show use of a modeling language herein are provided merely to illustrate clear examples. Thus, in one alternative, Javan objects and instance variables may be used to define custom metric objects programmatically without using a modeling language to define the objects and instance variables.

Figure 2F:
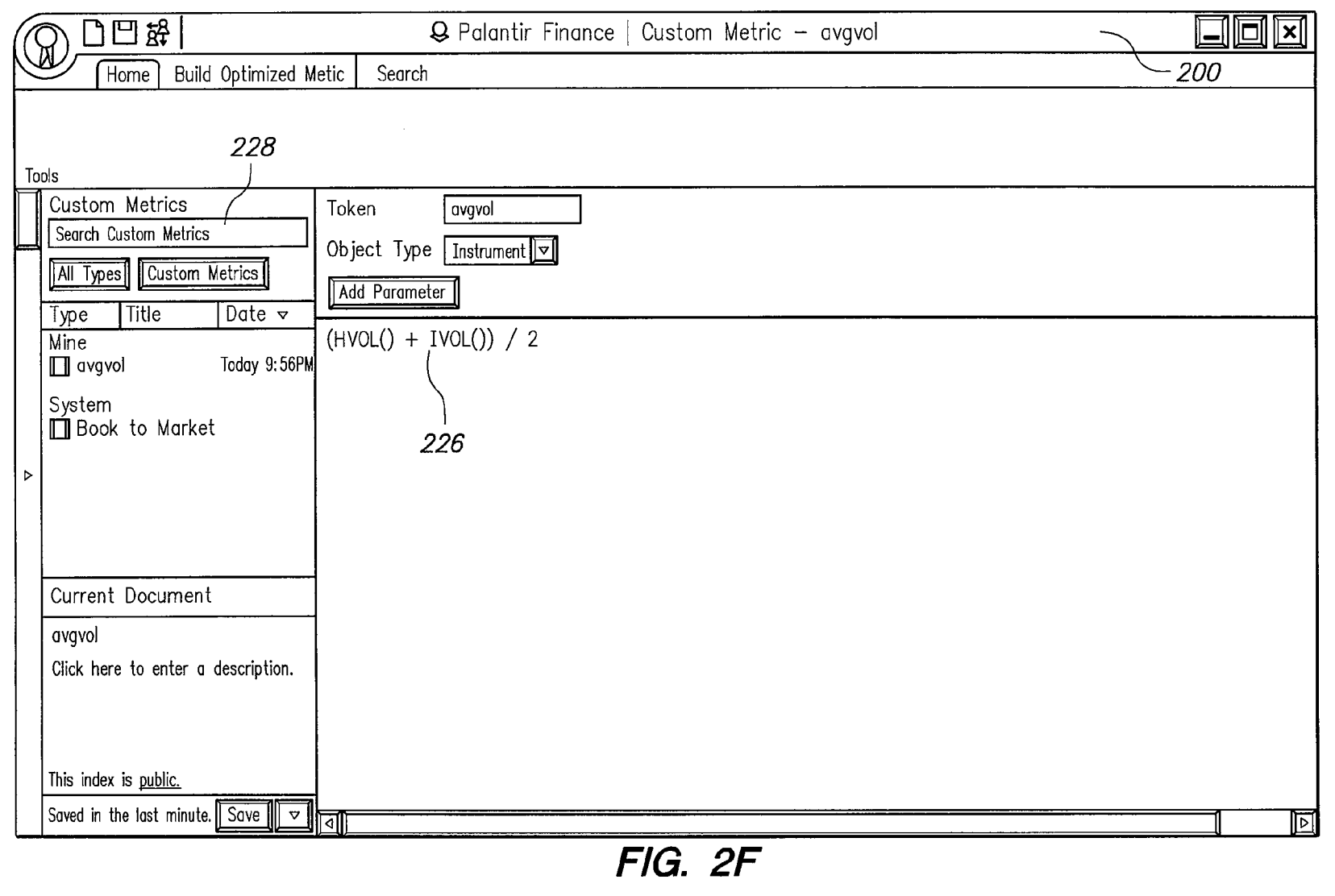
Figure 2G:
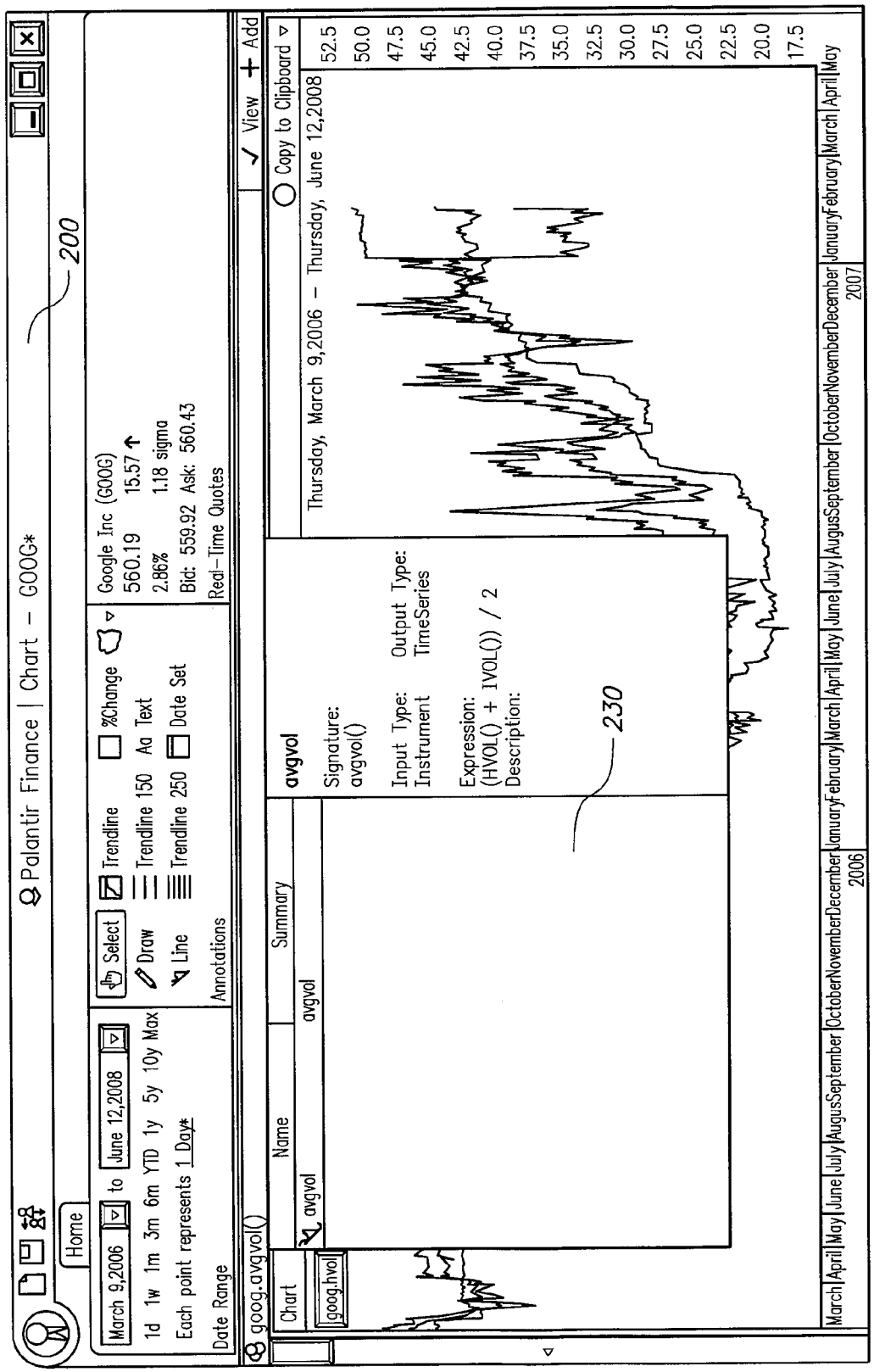
FIG. 2G illustrates an example graphical user interface related to selecting a custom metric.

As illustrated in FIG. 2F, in an embodiment that uses a modeling language, a user may type an expression "(HVOL( )+IVOL( ))/2" as 226 of FIG. 2F to define a new custom metric. For the purpose of illustration only, "HVOL( )" and "IVOL( )" may be two tokens for two functions. Tokens for other constructs may also be used. The user may give a new token "avgvol( )" for this new metric. Subsequently, as shown in FIG. 2G, the token "avgvol( )" for the new metric may be displayed as a selectable item in a dialog pane 230 of FIG. 2G. This new metric may be used together with an instrument such as "GOOG" to cause a new time series to be created and displayed. This new time series is produced by averaging values from two time series as specified by "HVOL( )" and "IVOL( )", as defined by the user in FIG. 2F.

Figure 2H:
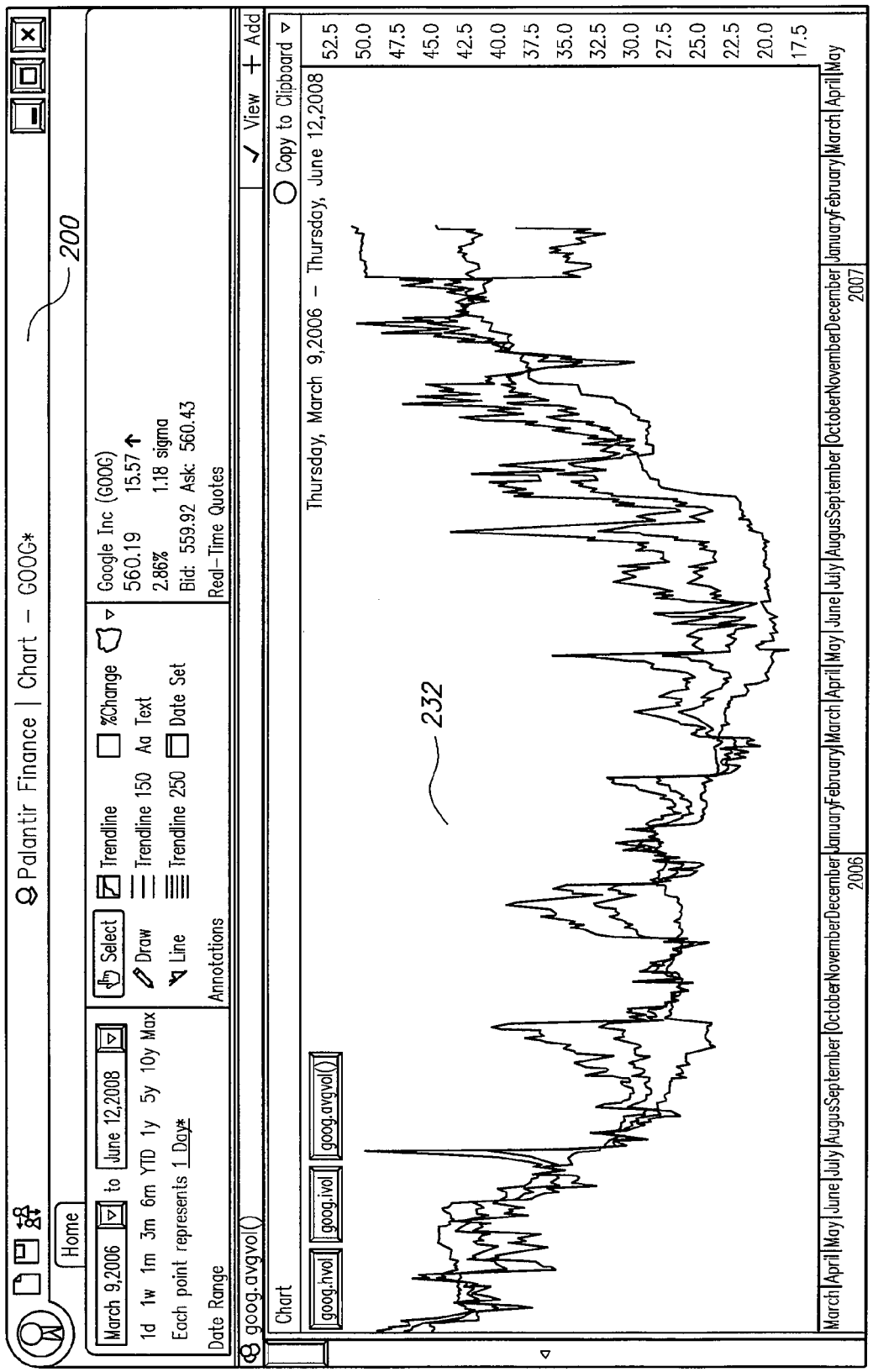
FIG. 2H illustrates an example graphical user interface related to displaying results involving a custom metric.

The data analysis system may immediately make available this new type of object (e.g., a new function "avgvol( )") to all users of the system. The users simply specify the token associated with the new type of object in subsequent expressions. As shown in FIG. 2H, time series representing "HVOL( )" and "IVOL( )" can be displayed in a content pane 232 of FIG. 2H, along with a new time series as specified by the new token (i.e., "avgvol( )").

In this manner, new types of objects and new types of expressions can be continuously added to the data analysis system, which causes the object model to evolve over the time. For example, a user may continuously define new hypotheses as new object types or as new instances of existing object types and timely test the new hypotheses in a rapidly changing market. Evaluations of some of these hypotheses may be saved or cached along with the definitions for the hypotheses. These hypotheses can also be recalled, re-studied, and reused by way of suitable tokens at a later time.

7 Example Process Flow

Figure 3:
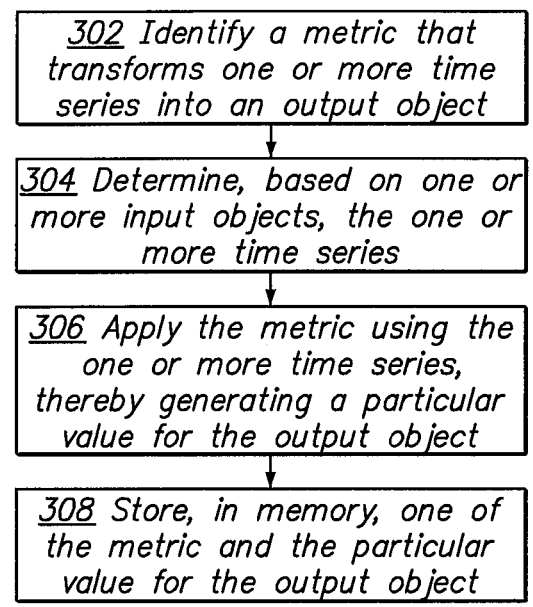
FIG. 3 illustrates an example process flow.

FIG. 3 illustrates an example process that uses a metric to generate an output object based on one or more time series determined from one or more input objects.

FIG. 3 illustrates an example process related to creating objects in the object model. In block 302, the data analysis system 100 identifies a metric that transforms one or more time series into an output object. For example, through interacting with a user at client 120 via graphical user interface 200 illustrated in FIG. 2A, the data analysis system 100 may receive a request from the user to create a date set. Based on the request, the data analysis system 100 may identify an existing metric among a plurality of metrics that output date sets. In an alternative embodiment, the data analysis system 100 may create a new metric anew that performs the desired transformation and identify the new metric for the purpose of creating the date set. For the purpose of illustration, this particular metric may transform a calendar and a set of criteria into a date set (i.e., the output object) comprising time values that come from the calendar and satisfy the set of criteria.

In block 304, the data analysis system 100 determines, based on one or more input objects, the one or more time series. For example, input object may be the calendar and the set of criteria, a part of which is displayed in 202 of FIG. 2A. The calendar may be used to generate the one or more time series.

In block 306, the data analysis system 100 applies the metric using the one or more time series, thereby generating a particular value for the output object. For example, the metric may be used by the data analysis system 100 to transform the time series that represents the calendar into a date set in the form of a time series comprising time values satisfying the set of criteria.

In block 308, the data analysis system 100 store, in memory, one of the metric and the particular value for the output object. In some embodiments, any of other objects, time series, and parameters may also be stored. For example, the user may specify a name for the date set in 204 of FIG. 2A and request the metric that generates the date set be stored in a physical storage device.

For the purpose of this invention, other objects including the higher-order objects and the higher-order objects described above may also be created in a similar manner. For example, this example process can be repeated to produce higher-order objects based on time series determined from higher-order objects or zero-order objects. In this manner, higher-order objects may be built on top of higher-order objects in the object model.

8 Extensions and Alternatives

Data analysis according to the techniques described herein is not limited to any particular tool or any particular type of analysis. Thus, the examples of data analysis provided herein are to be regarded in an illustrative rather than a restrictive sense.

9 Example Implementation Hardware

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   accessing, by a data analysis system computer under program control of a data exploring logic, an object model stored on one or more computer-readable storage media, the object model comprising:
      a plurality of zero-order building block objects comprising a plurality of instruments corresponding to raw data that dynamically increases over time, wherein the zero-order building block objects are not decomposable into other objects;
      a plurality of higher-order objects that are decomposable into two or more of the zero-order building block objects; and
      a plurality of metrics that transform one or more input objects into an output object;
   providing, to a user for execution on a client computing device, a data analysis application that includes an interface for dynamically creating a custom metric object;
   receiving from the client computing device, by the data analysis system computer, user input comprising an expression that defines a new custom metric, the expression identifying a first metric configured to group two or more input objects, selected from the plurality of zero-order building block objects and the plurality of higher-order objects, into an output collection object;
   adding, by the data analysis system computer, the new custom metric to the object model stored on the one or more computer-readable storage media;
   dynamically loading the new custom metric into the data analysis system computer as a part of the data exploring logic;
   after loading the new custom metric, dynamically providing access to the new custom metric in the application executing on the client computing device;
   receiving from the client computing device, by the data analysis system computer, user input identifying the new custom metric and one or more input collection objects of the plurality of higher-order objects of the object model stored on the one or more computer-readable storage media;
   decomposing, by the data analysis system computer, the one or more input collection objects into two or more child objects based on the object model;
   applying, by the data analysis system computer, the new custom metric to the one or more input collection objects by generating an output object based on the raw data corresponding to the two or more child objects.

2. The method of claim 1, wherein at least one of the output collection object and the one or more input collection objects is an instrument group that comprises one or more instruments selected from a universe of instruments using a filter chain.

3. The method of claim 1, wherein the object model is specified in a document that specifies a tree, wherein the plurality of instruments are represented by leaf nodes of the tree, wherein the plurality of higher-order objects are represented by non-leaf nodes of the tree, wherein an object represented by a non-leaf node in the tree is decomposable into objects represented by nodes descending from the non-leaf node.

4. The method of claim 1, wherein the new custom metric is a specified as a token by a user after a data analysis system is deployed, and wherein the new custom metric can be immediately accessed by referring to the token after the new custom metric is dynamically loaded into the data analysis system as a part of computing logic of the data analysis system.

5. The method of claim 1, wherein the two or more child objects include at least one time series whose value is not associated with an instrument.

6. The method of claim 1, wherein the plurality of instruments comprises one or more ontological relationships among all instruments in the plurality of instruments.

7. The method of claim 1, wherein the metric includes one or more input arguments whose runtime values influence runtime behaviors of the metric.

8. The method of claim 1, wherein at least one of the output collection object and the input collection object is an index that indicates a collective value of one or more instruments.

9. The method of claim 1, wherein at least one of the output collection object and the input collection object is a portfolio that comprises at least one instrument, at least one date set, and one or more trades that refer to times represented in the at least one date set.

10. A non-transitory machine-readable storage medium comprising one or more program instructions recorded thereon, which instructions, when executed by one or more processors, cause the one or more processors to perform the steps of:
   accessing, by a data analysis system computer under program control of a data exploring logic, an object model stored on one or more computer-readable storage media, the object model comprising:
      a plurality of zero-order building block objects comprising a plurality of instruments corresponding to raw data that dynamically increases over time, wherein the zero-order building block objects are not decomposable into other objects;
      a plurality of higher-order objects that are decomposable into two or more of the zero-order building block objects; and
      a plurality of metrics that transform one or more input objects into an output object;
   providing, to a user for execution on a client computing device, a data analysis application that includes an interface for dynamically creating a custom metric object;
   receiving from the client computing device, by the data analysis system computer, user input comprising an expression that defines a new custom metric, the expression identifying a first metric configured to group two or more input objects, selected from the plurality of zero-order building block objects and the plurality of higher-order objects, into an output collection object;

adding, by the data analysis system computer, the new custom metric to the object model stored on the one or more computer-readable storage media;

dynamically loading the new custom metric into the data analysis system computer as a part of the data exploring logic;

after loading the new custom metric, dynamically providing access to the new custom metric in the application executing on the client computing device;

receiving from the client computing device, by the data analysis system computer, user input identifying the new custom metric and one or more input collection objects of the object model stored on the one or more computer-readable storage media;

decomposing, by the data analysis system computer, the one or more input collection objects into two or more child objects based on the object model;

applying, by the data analysis system computer, the new custom metric to the one or more input collection objects by generating an output object based on the raw data corresponding to the two or more child objects.

11. The medium of claim 10, wherein at least one of the output collection object and the one or more input collection objects is an instrument group that comprises one or more instruments selected from a universe of instruments using a filter chain.

12. The medium of claim 10, wherein the object model is specified in a document that specifies a tree, wherein the plurality of instruments are represented by leaf nodes of the tree, wherein the plurality of higher-order objects are represented by non-leaf nodes of the tree, wherein an object represented by a non-leaf node in the tree is decomposable into objects represented by nodes descending from the non-leaf node.

13. The medium of claim 10, wherein the new custom metric is specified as a token by a user after a data analysis system is deployed, and wherein the new custom metric can be immediately accessed by referring to the token after the new custom metric is dynamically loaded into the data analysis system as a part of computing logic of the data analysis system.

14. The medium of claim 10, wherein the two or more child objects include at least one time series whose value is not associated with an instrument.

15. The medium of claim 10, wherein the plurality of instruments comprises one or more ontological relationships among all instruments in the plurality of instruments.

16. The medium of claim 10, wherein the metric include one or more input arguments whose runtime values influence runtime behaviors of the metric.

17. The medium of claim 10, wherein at least one of the output collection object and the input collection object is an index that indicates a collective value of one or more instruments.

18. The medium of claim 10, wherein at least one of the output collection object and the input collection object is a portfolio that comprises at least one instrument, at least one date set, and one or more trades that refer to times represented in the at least one date set.

19. An application server comprising:
a network interface that is coupled to a data network for receiving one or more packet flows therefrom;
a processor; and
one or more stored program instructions for data exploration logic which, when executed by the processor, cause the processor to carry out the steps of:
accessing an object model stored on one or more computer-readable storage media, the object model comprising:
a plurality of zero-order building block objects comprising a plurality of instruments corresponding to raw data that dynamically increases over time, wherein the zero-order building block objects are not decomposable into other objects;
a plurality of higher-order objects that are decomposable into two or more of the zero-order building block objects; and
a plurality of metrics that transform one or more input objects into an output object;
providing, to a user for execution on a client computing device, a data analysis application that includes an interface for dynamically creating a custom metric object;
receiving user input comprising an expression that defines a new custom metric, the expression identifying a first metric configured to group two or more input objects, selected from the plurality of zero-order building block objects and the plurality of higher-order objects, into an output collection object;
adding the new custom metric to the object model stored on the one or more computer-readable storage media;
dynamically loading the new custom metric as a part of the data exploring logic;
after loading the new custom metric, dynamically providing access to the new custom metric in the application executing on the client computing device;
receiving user input identifying the new custom metric and one or more input collection objects of the object model stored on the one or more computer-readable storage media;
decomposing the one or more input collection objects into two or more child objects based on the object model;
applying the new custom metric to the one or more input collection objects by generating an output object based on the raw data corresponding to the two or more child objects.

20. The application server of claim 19, wherein at least one of the output collection object and the one or more input collection objects is an instrument group that comprises one or more instruments selected from a universe of instruments using a filter chain.

21. The application server of claim 19, wherein the object model is specified in a document that specifies a tree, wherein the plurality of instruments are represented by leaf nodes of the tree, wherein the plurality of higher-order objects are represented by non-leaf nodes of the tree, wherein an object represented by a non-leaf node in the tree is decomposable into objects represented by nodes descending from the non-leaf node.

22. The application server of claim 19, wherein the new custom metric is specified as a token by a user after a data analysis system is deployed, and wherein the new custom metric can be immediately accessed by referring to the token after the new custom metric is dynamically loaded into the data analysis system as a part of computing logic of the data analysis system.

23. The application server of claim 19, wherein the two or more child objects include at least one time series whose value is not associated with an instrument.

24. The application server of claim 19, wherein the plurality of instruments comprises one or more ontological relationships among all instruments in the plurality of instruments.

25. The application server of claim 19, wherein the metric include one or more input arguments whose runtime values influence runtime behaviors of the metric.

26. The application server of claim 19, wherein at least one of the output collection object and the input collection object is an index that indicates a collective value of one or more instruments.

27. The application server of claim 19, wherein at least one of the output collection object and the input collection object is a portfolio that comprises at least one instrument, at least one date set, and one or more trades that refer to times represented in the at least one date set.

\* \* \* \* \*